No. 732,500. PATENTED JUNE 30, 1903.
J. S. BAKER.
SPECTACLES.
APPLICATION FILED MAR. 11, 1903.
NO MODEL.

Witnesses
H. F. Meyer Jr.
G. F. Vogt.

Inventor
Jacob S. Baker
By Mann & Co,
Attorneys

No. 732,500.

Patented June 30, 1903.

UNITED STATES PATENT OFFICE.

JACOB S. BAKER, OF GLENROCK, PENNSYLVANIA.

SPECTACLES.

SPECIFICATION forming part of Letters Patent No. 732,500, dated June 30, 1903.

Application filed March 11, 1903. Serial No. 147,232. (No model.)

*To all whom it may concern:*

Be it known that I, JACOB S. BAKER, a citizen of the United States, residing at Glenrock, in the county of York and State of Pennsylvania, have invented certain new and useful Improvements in Spectacles, of which the following is a specification.

My invention relates to improvements in eyeglasses or spectacles in which a plurality of lenses may be carried or supported by a single bridge.

One object of the invention is to provide a device carrying a plurality of lenses arranged and operated in such a manner, for example, that for reading purposes one pair of lenses may be adjusted in front of the eyes, and for distant use another pair of said lenses may be adjusted in combination with the first pair, thus embodying in the one frame lenses suitable for different purposes.

The invention consists of the novel construction and combination of parts, as will be described in the following specification, and particularly pointed out in the appended claims.

The invention is illustrated in the accompanying drawings, in which—

Figure 1:
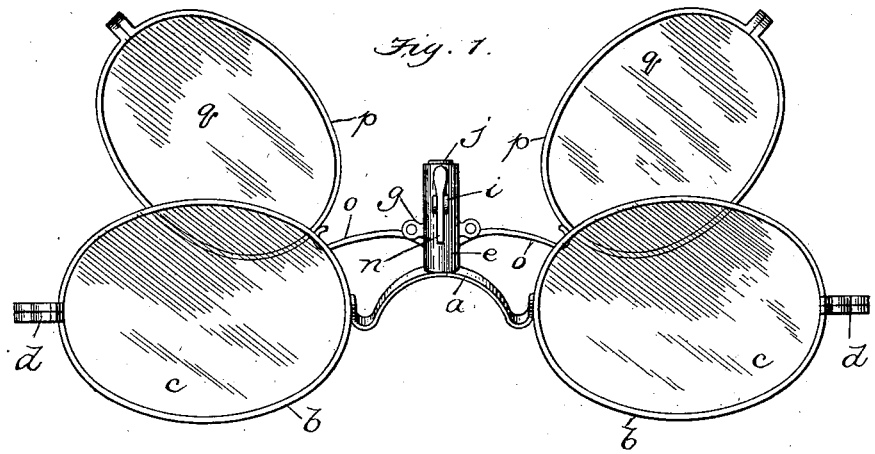
Figure 2:
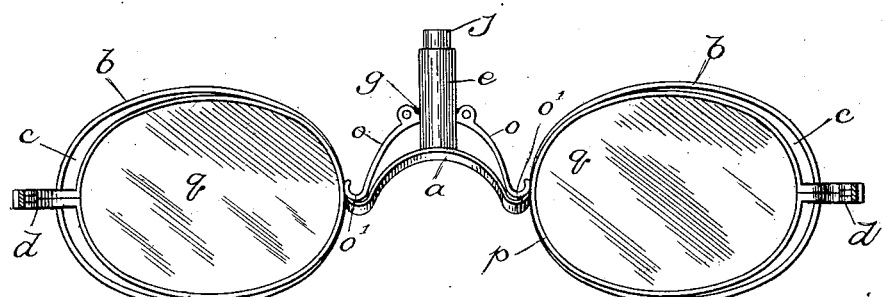
Figures 3, 4, 5, 6:
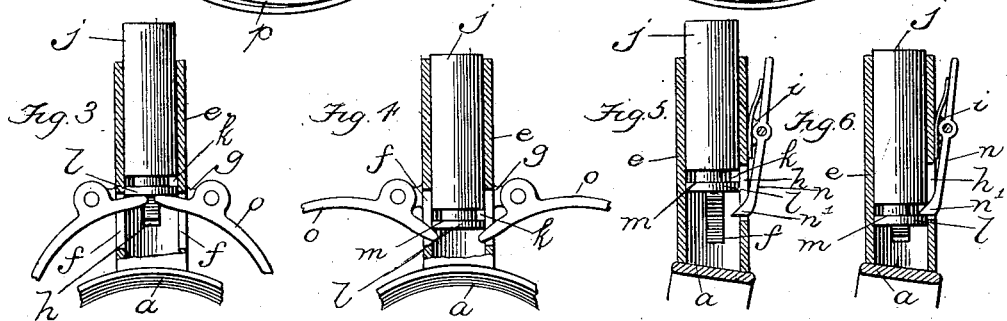

Figure 1 illustrates a front elevation of a pair of eyeglasses or spectacles employing my invention and shows one pair of lenses elevated and out of focus with the other pair. Fig. 2 illustrates a rear view of same with both pairs of lenses in focus. Fig. 3 is a vertical longitudinal section, on an enlarged scale, through the vertical guide when both pairs of lenses are in focus as in Fig. 2. Fig. 4 is a similar view when the lenses are in the position shown in Fig. 1. Fig. 5 is a vertical cross-section through said guide and illustrates the position of the plunger and spring-catch when the lenses are in focus; and Fig. 6 illustrates a similar view when the lenses are in the elevated position and shows the spring-catch in engagement with the plunger to hold the latter in the depressed position as in Figs. 1 and 4.

In the drawings the invention is shown as applied to spectacles; but it is to be understood that the improvement may also be applied to what are commonly called "eyeglasses." It is also to be understood that the invention is not limited as to the particular kind of lenses employed.

In the drawings, $a$ designates the nose-bridge piece, of any suitable shape and which in the present instance supports at each side an elliptical frame $b$, each of which holds a lens $c$. In the present instance each of the frames $b$ is provided at one side with a hinge-joint $d$, which supports one end of the usual temple or ear bar. (Not shown.) The frames $b$ and the ear-bars may, however, be dispensed with, in which case the bridge will be riveted direct to the lenses $c$ in the ordinary way. A guide $e$ is secured to the bridge in any suitable manner and extends vertically therefrom. In the present instance this guide comprises a tube and is provided at diametrically opposite sides with a slot $f$, and at the side of each of said slots the tube is provided with a lug $g$. The guide-tube is also provided with a slot $h$, which has position in the tube at right angles to the slots $f$, and said tube is further provided on its exterior with two ears $i$, which have position above the slot $h$. A plunger $j$ has position within the guide-tube $e$ and has a vertical movement therein, and said plunger is provided near its bottom with a circumferential groove $k$, thereby forming a head $l$ and shoulder $m$ on the end of said plunger. A spring-catch $n$ is pivoted between the two ears $i$, and the end $n'$ of said catch takes in the slot $h$ of the tube and engages the shoulder $m$ of the head $l$ when the plunger is depressed. A lever $o$ is pivoted near one end to the lug $g$, and one end of said lever projects through the slot $f$ and into the guide or tube $e$ and has position in said guide beneath the head $l$ of the plunger. A similar lever projects from the opposite side of the guide, and each of these levers $o$ carries a frame $p$ and lens $q$ at its outer end. The frames $p$, however, may also be dispensed with and the levers riveted direct to each lens.

The frames $p$ and the lenses $q$ are preferably slightly smaller than the frames $b$ and lenses $c$ in order that they will drop easily into position and in correct focus with the said lenses $c$. It will also be seen that when the lenses $c$ and $q$ are in focus or in the position shown in Fig. 2 the lens end $o'$ of each of the levers o rests on the bridge a, and the latter serves as a stop and insures that the lenses will be centered with respect to each other and in correct focus.

It is to be understood that the guide e is not limited to a tubular construction, but may be constructed in various ways.

It will be readily understood that by depressing the plunger j, as shown in Figs. 1 and 4, the head l will push the ends of the levers o downward and the opposite or lens ends upward, and when the plunger is depressed sufficiently the spring-catch n will engage the shoulder m on the head l and hold the plunger down and the lenses q elevated. By depressing the upper end of the spring-catch n the lower end of said catch will be disengaged from the plunger and the lenses q will drop into position behind the lenses c.

Having thus fully described my invention, what I claim as new, and desire to secure by Letters Patent, is—

1. In an eyeglass or spectacle the combination of a nose-bridge; a pair of lenses rigidly connected with said bridge; a guide rigidly attached to said nose-bridge and projecting vertically therefrom; a pair of lenses pivoted to said guide, and a plunger movable in the guide and operating the said pivoted lenses.

2. In an eyeglass or spectacle the combination of a bridge; a pair of lenses supported by said bridge; a tubular guide; a plunger movable in said tubular guide; a pair of lenses movable with respect to said guide and a pair of levers pivoted to said tubular guide and coacting between said plunger and said movable lenses for operating the latter.

3. In an eyeglass or spectacle the combination of a bridge; a pair of lenses supported by said bridge; a guide; a plunger movable in said guide, said plunger having a head and shoulder near its lower end; a pair of levers, one end of each of which engages the head on said plunger and a lens supported on the other end of each of said levers.

4. In an eyeglass or spectacle the combination of a bridge; a pair of lenses supported by said bridge; a tubular guide also supported by said bridge and provided at diametrically opposite sides with a slot; a plunger movable in said tubular guide and a pair of levers pivoted to said tubular guide and at their outer ends each carrying a lens and the inner ends of said levers projecting through the slots in said guide for the purpose set forth.

5. In an eyeglass or spectacle the combination of a bridge; a pair of lenses supported by said bridge; a tubular guide also supported by said bridge and provided at diametrically opposite sides with a slot; a plunger movable in said guide, and having a head at its lower end, a pair of levers pivoted to said guide and at their outer ends each carrying a lens and the inner ends of said levers projecting through the slots in said guide and taking beneath said plunger, and a catch device also pivoted to said guide and engaging the head on the lower end of the plunger to hold the movable lenses elevated.

In testimony whereof I affix my signature in the presence of two witnesses.

JACOB S. BAKER.

Witnesses:
J. B. SWITZER,
URIAH S. DISE.